United States Patent
Brown et al.

(10) Patent No.: US 7,512,942 B2
(45) Date of Patent: Mar. 31, 2009

(54) MODEL-DRIVEN SOFTWARE DEPLOYMENT IN AN APPLICATION SERVER

(75) Inventors: Kyle Gene Brown, Apex, NC (US); Grant J. Larsen, Littleton, CO (US); Arunava Majumdar, Chicago, IL (US); Thomas Francis McElroy, Durham, NC (US); Guruprasad Chitrapur Vasudeva, New Albany, OH (US)

(73) Assignee: International Business Machines Corporation, Armonk, NY (US)

( * ) Notice: Subject to any disclaimer, the term of this patent is extended or adjusted under 35 U.S.C. 154(b) by 699 days.

(21) Appl. No.: 11/210,579

(22) Filed: Aug. 24, 2005

(65) Prior Publication Data

US 2007/0055972 A1    Mar. 8, 2007

(51) Int. Cl.
*G06F 9/45* (2006.01)
(52) U.S. Cl. .................................... 717/174
(58) Field of Classification Search .................. 717/174
See application file for complete search history.

(56) References Cited

U.S. PATENT DOCUMENTS

| | | | | |
|---|---|---|---|---|
| 5,822,531 | A * | 10/1998 | Gorczyca et al. ............ 709/221 |
| 6,651,062 | B2 * | 11/2003 | Ghannam et al. ............. 707/10 |
| 6,980,211 | B2 * | 12/2005 | Lin et al. ..................... 345/440 |
| 7,284,165 | B2 * | 10/2007 | Auvenshine et al. .......... 714/57 |
| 2003/0018832 | A1 | 1/2003 | Amirisetty et al. .......... 709/328 |
| 2003/0154239 | A1 | 8/2003 | Davis et al. ................. 709/201 |
| 2004/0187140 | A1 | 9/2004 | Aigner et al. ............... 719/328 |
| 2005/0119928 | A1 * | 6/2005 | Deitrich et al. ................ 705/9 |

* cited by examiner

*Primary Examiner*—John Chavis
(74) *Attorney, Agent, or Firm*—Yee & Associates, P.C.; Martin J. McKinley

(57) ABSTRACT

A method, system and computer program product is provided for deploying software in a data processing system. A topology pattern is selected in which the selected topology pattern describes an arrangement of software and hardware devices. Augments to the selected topology pattern are received to form an augmented topology pattern after a selection of a selected topology pattern from a plurality of topology patterns. The augmented topology pattern is transformed into a set of deployable scripts, wherein the set of deployable scripts is used for the software deployment.

3 Claims, 7 Drawing Sheets

MODEL-DRIVEN SOFTWARE DEPLOYMENT IN AN APPLICATION SERVER

BACKGROUND OF THE INVENTION

1. Field of the Invention

The present invention relates generally to application deployment. Still more particularly, the present invention provides a method to use template diagrams, models or patterns to describe the topology consisting of physical software systems.

2. Description of the Related Art

The packaging of Java™ 2 Platform Enterprise Edition (J2EE™) applications are defined by the J2EE™ 1.2 specification. The intent of the specification is that Enterprise ARchive (EAR) files, the fundamental constructs that contain applications, be completely self-contained. Applications are expected to use Application Program Interfaces (APIs) provided by the J2EE™ server vendor, or those within the Enterprise ARchive, and nothing else. This way, applications can be independent of each other. This, in fact, is stated quite clearly in section 8.1.2 of the specification:

A J2EE™ application consists of one or more J2EE™ modules and one J2EE™ application deployment descriptor. A J2EE™ application is packaged using the Java™ Archive (JAR) file format into a file with an .ear (Enterprise ARchive) filename extension. A minimal J2EE™ application package will only contain J2EE™ modules and the application deployment descriptor. A J2EE™ application package may also include libraries referenced by J2EE™ modules, help files and documentation to aid the deployer, etc.

The deployment of a portable J2EE™ application should not depend on any entities that may be contained in the package other than those defined by this specification. Deployment of a portable J2EE™ application must be possible using only the application deployment descriptor and the J2EE™ modules (and their dependent libraries) and descriptors listed in it.

This statement, however, does not address the issue of the sharing of common code, or what are often referred to as dependent libraries. Essentially, these common libraries, which may be developed internally or purchased from external vendors, provide common function to multiple applications at run time. Creating common code is extremely valuable and provides a number of benefits that have been widely discussed elsewhere.

Current solutions for managing deployment of J2EE™ application servers are mostly manual processes. For instance, to deploy an application in an environment demanding high uptime, a deployer will be responsible for determining a topology capable of providing failover capabilities for an application, creating the application servers on those nodes, and then deploying the applications on the new cluster. In addition, the deployer must determine which resources, such as WebSphere® MQ queues, and databases are required by the application. Then, the deployer must configure both the application servers with the appropriate drivers and resource adapters to communicate to those resources, as well as creating the resources within their own respective servers.

BRIEF SUMMARY OF THE INVENTION

The aspects of the present invention provide a method, system, and computer usable code for deploying software in a data processing system. A topology pattern is selected in which the selected topology pattern describes an arrangement of software and hardware devices. Augments to the selected topology pattern are received to form an augmented topology pattern after a selection of a selected topology pattern from a plurality of topology patterns. The augmented topology pattern is transformed into a set of deployable scripts, wherein the set of deployable scripts is used for the software deployment.

BRIEF DESCRIPTION OF THE SEVERAL VIEWS OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

DETAILED DESCRIPTION OF THE INVENTION

Figure 1:
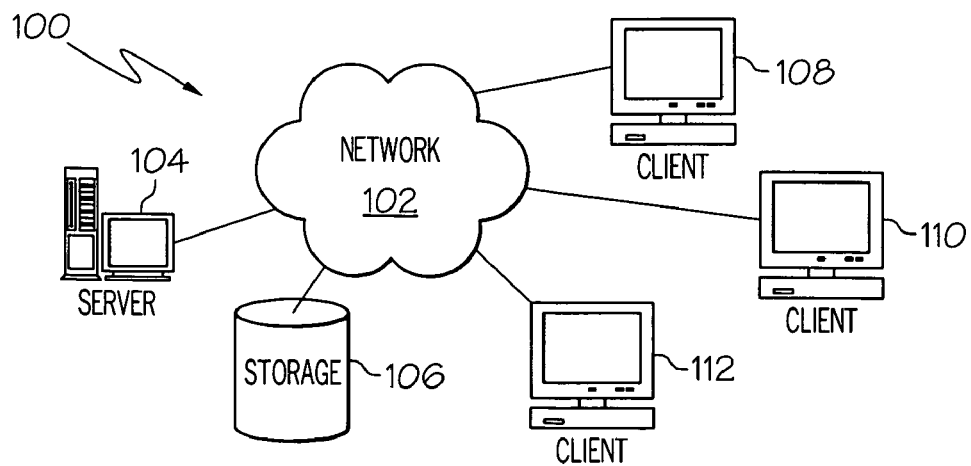
FIG. 1 is a pictorial representation of a network of data processing systems in which the present invention may be implemented.
Figure 2:
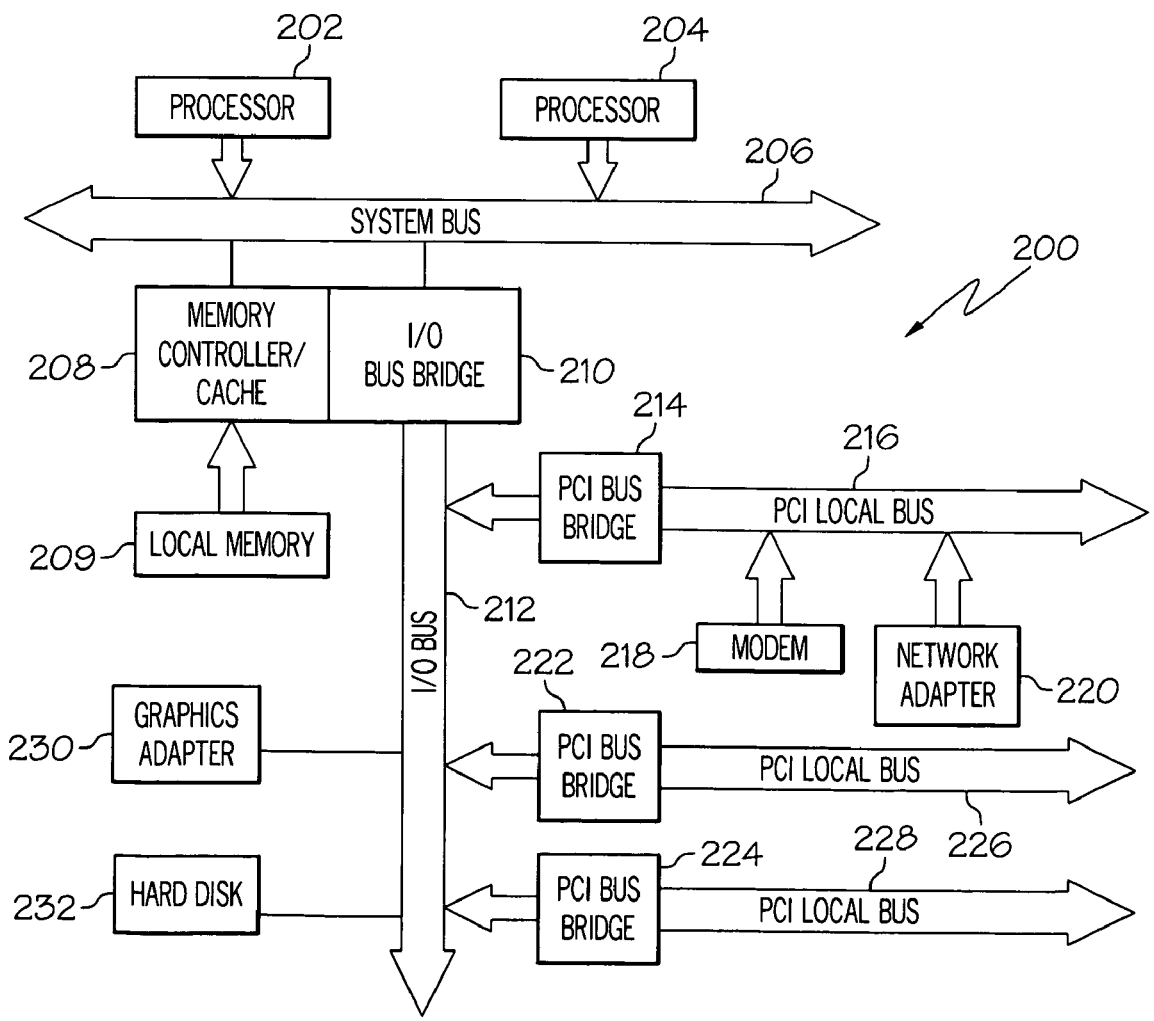
FIG. 2 is a block diagram of a data processing system that may be implemented as a server in accordance with an illustrative embodiment of the present invention.
Figure 3:
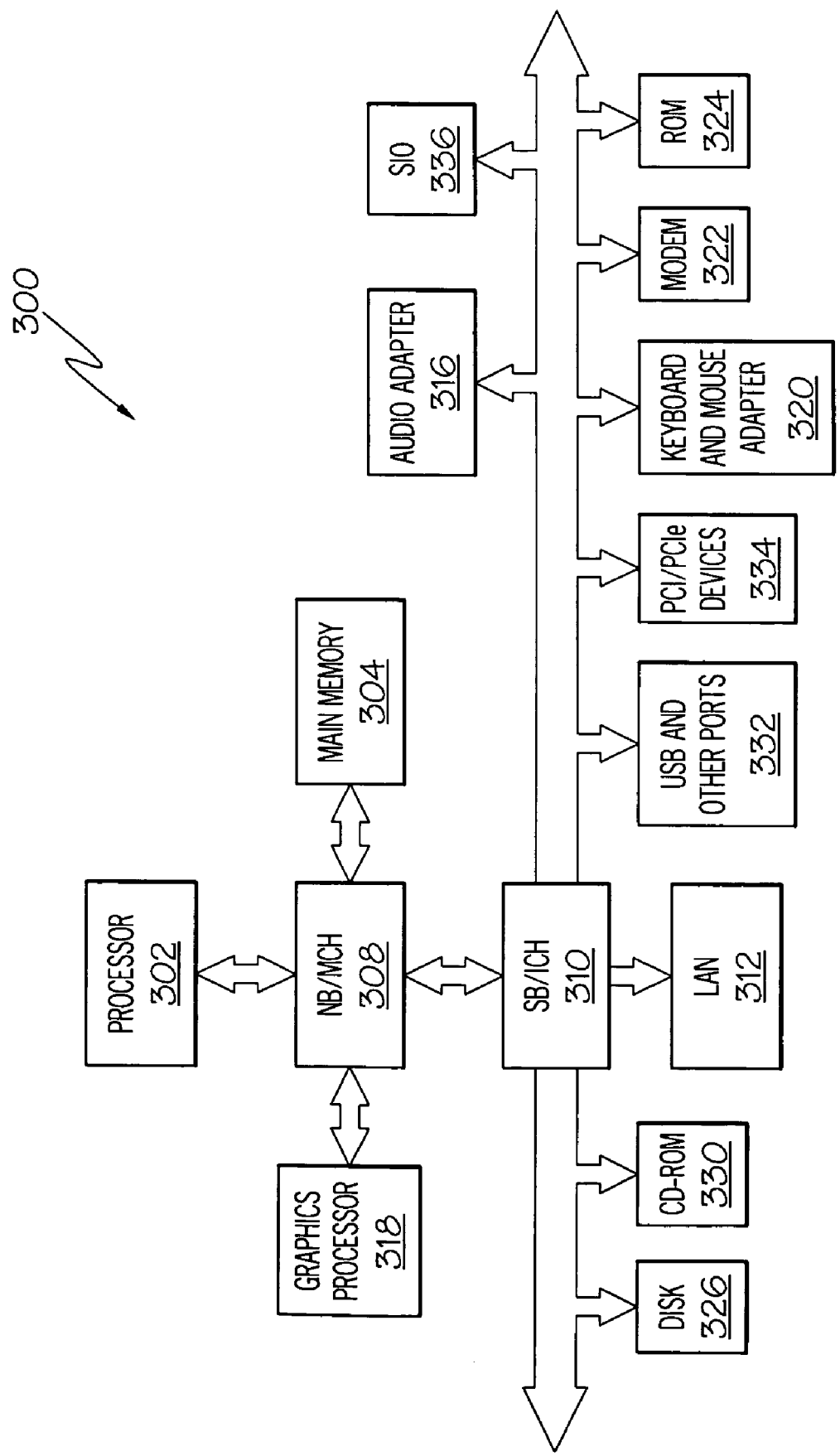
FIG. 3 is a block diagram of a data processing system in which the present invention may be implemented.

Aspects of the present invention provide a mechanism for modeling software deployments in an abstract method. The data processing device may be a stand-alone computing device or may be a distributed data processing system in which multiple computing devices are utilized to perform various aspects of the present invention. Therefore, the following FIGS. 1-3 are provided as exemplary diagrams of data processing environments in which the present invention may be implemented. It should be appreciated that FIGS. 1-3 are only exemplary and are not intended to assert or imply any limitation with regard to the environments in which the present invention may be implemented. Many modifications to the depicted environments may be made without departing from the spirit and scope of the present invention.

With reference now to the figures, FIG. 1 depicts a pictorial representation of a network of data processing systems in which the present invention may be implemented. Network data processing system 100 is a network of computers in which the present invention may be implemented. Network data processing system 100 contains a network 102, which is the medium used to provide communications links between various devices and computers connected together within network data processing system 100. Network 102 may include connections, such as wire, wireless communication links, or fiber optic cables.

In the depicted example, server 104 is connected to network 102 along with storage unit 106. In addition, clients 108, 110, and 112 are connected to network 102. These clients 108, 110, and 112 may be, for example, personal computers or network computers. In the depicted example, server 104 provides data, such as boot files, operating system images, and applications to clients 108-112. Clients 108, 110, and 112 are clients to server 104. Network data processing system 100 may include additional servers, clients, and other devices not shown.

In accordance with an illustrative embodiment of the present invention, server 104 provides application integration tools to application developers for applications that are used on clients 108, 110, 112. More particularly, server 104 may provide access to application integration tools that will allow two different front-end applications in two different formats to disseminate messages sent from each other.

In accordance with one illustrative embodiment, a dynamic framework is provided for using a graphical user interface (GUI) for configuring business system management software. This framework involves the development of user interface (UI) components for business elements in the configuration of the business system management software, which may exist on storage 106. This framework may be provided through editor mechanism on server 104 in the depicted example. The UI components and business elements may be accessed, for example, using a browser client application on one of clients 108, 110, 112.

In the depicted example, network data processing system 100 is the Internet with network 102 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers, consisting of thousands of commercial, government, educational and other computer systems that route data and messages. Of course, network data processing system 100 also may be implemented as a number of different types of networks, such as for example, an intranet, a local area network (LAN), or a wide area network (WAN). FIG. 1 is intended as an example, and not as an architectural limitation for the present invention.

Referring to FIG. 2, a block diagram of a data processing system that may be implemented as a server, such as server 104 in FIG. 1, is depicted in accordance with an illustrative embodiment of the present invention. Data processing system 200 may be a symmetric multiprocessor (SMP) system including a plurality of processors 202 and 204 connected to system bus 206. Alternatively, a single processor system may be employed. Also connected to system bus 206 is memory controller/cache 208, which provides an interface to local memory 209. I/O bus bridge 210 is connected to system bus 206 and provides an interface to I/O bus 212. Memory controller/cache 208 and I/O bus bridge 210 may be integrated as depicted.

Peripheral component interconnect (PCI) bus bridge 214 connected to I/O bus 212 provides an interface to PCI local bus 216. A number of modems may be connected to PCI local bus 216. Typical PCI bus implementations will support four PCI expansion slots or add-in connectors. Communications links to clients 108-112 in FIG. 1 may be provided through modem 218 and network adapter 220 connected to PCI local bus 216 through add-in connectors.

Additional PCI bus bridges 222 and 224 provide interfaces for additional PCI local buses 226 and 228, from which additional modems or network adapters may be supported. In this manner, data processing system 200 allows connections to multiple network computers. A memory-mapped graphics adapter 230 and hard disk 232 may also be connected to I/O bus 212 as depicted, either directly or indirectly.

Those of ordinary skill in the art will appreciate that the hardware depicted in FIG. 2 may vary. For example, other peripheral devices, such as optical disk drives and the like, also may be used in addition to or in place of the hardware depicted. The depicted example is not meant to imply architectural limitations with respect to the present invention.

The data processing system depicted in FIG. 2 may be, for example, an IBM® eServer™ pSeries® system, a product of International Business Machines Corporation in Armonk, N.Y., running the Advanced Interactive Executive (AIX™) operating system or LINUX® operating system.

With reference now to FIG. 3, a block diagram of a data processing system is shown in which the present invention may be implemented. Data processing system 300 is an example of a computer, such as client 108 in FIG. 1, in which code or instructions implementing the processes of the present invention may be located. In the depicted example, data processing system 300 employs a hub architecture including a north bridge and memory controller hub (MCH) 308 and a south bridge and input/output (I/O) controller hub (ICH) 310. Processor 302, main memory 304, and graphics processor 318 are connected to MCH 308. Graphics processor 318 may be connected to the MCH through an accelerated graphics port (AGP), for example.

In the depicted example, local area network (LAN) adapter 312, audio adapter 316, keyboard and mouse adapter 320, modem 322, read only memory (ROM) 324, hard disk drive (HDD) 326, CD-ROM driver 330, universal serial bus (USB) ports and other communications ports 332, and PCI/PCIe devices 334 may be connected to ICH 310. PCI/PCIe devices may include, for example, Ethernet adapters, add-in cards, PC cards for notebook computers, etc. PCI uses a cardbus controller, while PCIe does not. ROM 324 may be, for example, a flash binary input/output system (BIOS). Hard disk drive 326 and CD-ROM drive 330 may use, for example, an integrated drive electronics (IDE) or serial advanced technology attachment (SATA) interface. A super I/O (SIO) device 336 may be connected to ICH 310.

An operating system runs on processor 302 and is used to coordinate and provide control of various components within data processing system 300 in FIG. 3. The operating system may be a commercially available operating system such as Windows XP™, which is available from Microsoft Corporation. An object oriented programming system, such as the Java™ programming system, may run in conjunction with the operating system and provides calls to the operating system from Java™ programs or applications executing on data processing system 300. "JAVA" is a trademark of Sun Microsystems, Inc.

Instructions for the operating system, the object-oriented programming system, and applications or programs are located on storage devices, such as hard disk drive 326, and may be loaded into main memory 304 for execution by processor 302. The processes of the present invention are performed by processor 302 using computer implemented instructions, which may be located in a memory such as, for example, main memory 304, memory 324, or in one or more peripheral devices 326 and 330.

Those of ordinary skill in the art will appreciate that the hardware in FIG. 3 may vary depending on the implementation. Other internal hardware or peripheral devices, such as flash memory, equivalent non-volatile memory, or optical disk drives and the like, may be used in addition to or in place of the hardware depicted in FIG. 3. Also, the processes of the present invention may be applied to a multiprocessor data processing system.

For example, data processing system 300 may be a personal digital assistant (PDA), which is configured with flash memory to provide non-volatile memory for storing operating system files and/or user-generated data. The depicted example in FIG. 3 and above-described examples are not meant to imply architectural limitations. For example, data processing system 300 also may be a tablet computer, laptop computer, or telephone device in addition to taking the form of a PDA.

Aspects of the present invention provide a tool with a similar level of topology modeling capability for administrators and deployment engineers. A user is allowed to import deployment diagrams and/or patterns that define a standard relationship between devices. The deployment diagrams and/or patterns are then transformed into a display model that may be displayed in a graphical user interface. The user is allowed to transform or augment the displayed model to add or delete devices and add detail to the devices and the relationships between devices so that a representation of all of the information necessary to perform application deployment and system configuration is provided. This transformation is then saved as a deployment model that is produced based on the detailed representation. Then, the deployment model is transformed again into a script model from which scripts may be produced for actual deployment of the application and system configuration.

Topology refers to the shape of a network, or the network's layout. That is, how different nodes in a network are connected to each other and how they communicate are determined by the network's topology. Topologies are either physical or logical. Topology patterns are patterns of different topologies.

Figure 4:
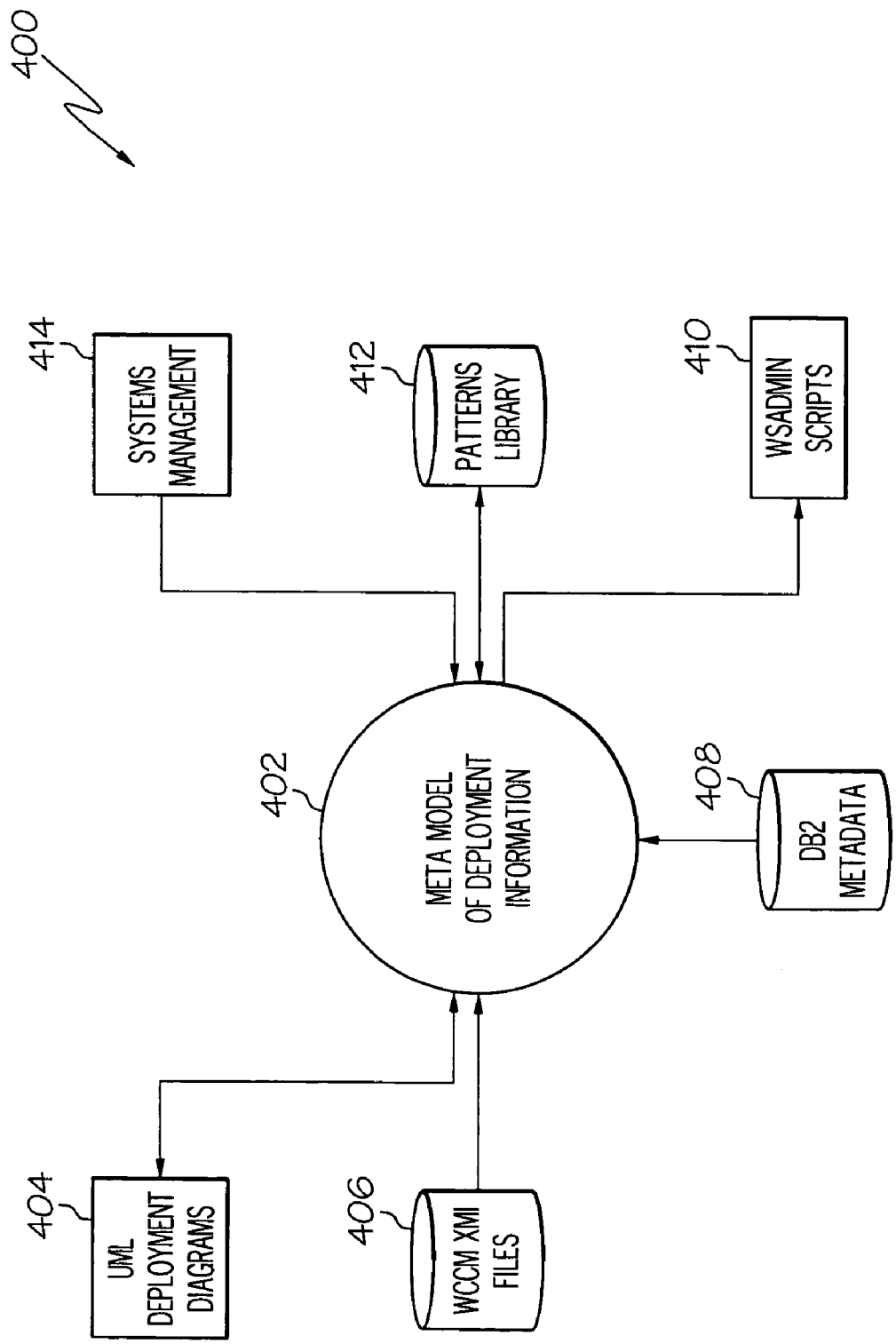
FIG. 4 is an exemplary functional block diagram of a modeling tool in accordance with an illustrative embodiment of the present invention.

FIG. 4 is an exemplary functional block diagram of a modeling tool in accordance with an illustrative embodiment of the present invention. As a mechanism of the present invention, modeling tool 400 has a meta-model 402, which may be an Eclipse Modeling Framework (EMF) eCore Unified Modeling Language (UML) model, that contains at least, but not limited to, the following:

(1) Representations of the nodes in a J2EE™ deployment network. This may include information such as node name, IP address, machine type, operating system, number of processors, installed memory, etc.

(2) Representations of the software deployed on each node in the network, including versions of WebSphere®, DB2®, IBM® hypertext transfer protocol server, Edge server components, etc.

(3) Representations of the stereotypes (roles) that each node plays in the network such as application server, hypertext transfer protocol server, etc.

(4) Representations of the application server instances, clustered server instances, cell managers, and other WebSphere® artifacts deployed on the nodes.

(5) Stereotyped representations of the connections between the nodes and servers, such as hypertext transfer protocol communication paths, Internet Inter-ORB Protocol (IIOP) communication paths.

(6) Representations of the applications deployed on each server, and connections to other existing unified modeling language meta-models for representing Enterprise ARchive (EAR) files and other application artifacts.

As an aspect of the present invention, a meta-model, such as meta-model 402, is a formal description of the way that a model is constructed. For example, in extensible markup language, there are extensible markup language documents that represent individual purchase orders or insurance quotes. However, these documents are described by something called an extensible markup language schema, which is a meta-model for the particular format being used, such as a format for purchase orders. Another example would be a representation of a computer language in a Backas-Naur Form (BNF). The programs written in the computer language must conform to the rules described in the Backas-Naur Form, but the Backas-Naur Form does not provide instruction of the information that is to be written, rather, just how it is formed.

In aspects of the present invention, meta-model 402 clearly describes a software deployment that details an application deployment and system configuration model's construction using a format that may be transformed into deployment scripts. In order to allow such a transformation, aspects of the present invention provide for a detailed description of every device and relationship that is added to meta-model 402. Meta-model 402 requires that all of models described below, including the augmented models formed from patterns and the patterns themselves, which may be "incomplete" or "template" models, conform to the description in meta-model 402. Thus, meta-model 402 is an application deployment and system configuration representation of data for all of the devices that are to be deployed and the devices interrelationships. This data, which may be a set of the Eclipse Modeling Framework file formats that directly correspond to a set of Java classes implemented using the Eclipse Modeling Framework, is used by the tool to construct the representations of the models and patterns in memory or on disk.

Meta-model 402 is shown to have exemplary potential inflows and outflows of information which are unified modeling language deployment diagrams 404, WebSphere® common configuration model (WCCM) extensible markup language (XML) metadata interchange (XMI) files 406, DB2® metadata 408, called WebSphere® Administration (WSAdmin) scripts 410, patterns library 412, and systems management 414. Systems management 414 may be any systems management software, such as Tivoli® systems management. Although only six inflows and outflows are depicted in model 400, any number of inflows and outflows may be included, depending on the implementation.

With regard to unified modeling language deployment diagrams 404, existing unified modeling language tools, such as Rational® extended Development Experience (XDE), may be used to provide a graphical representation of the underlying deployment meta-model 402. However, existing unified modeling language deployment diagrams, created using the standard unified modeling language deployment meta-model, are not sufficiently detailed to allow transformation into the form of deployment scripts. Aspects of the present invention provide for conversion of selected unified modeling language deployment diagrams into a model that may be modified. This conversion of the unified modeling language deployment diagrams may be through new software code, such as Java™. Rational® XDE, among other unified modeling language tools, includes the capability to model J2EE™ deployments in a very generic sense. An association may be between a Java™ Archive (JAR) file with a "node." An aspect of the present invention is to add on a fairly large set of stereotypes for "nodes" that allow administrators to define network topologies. That is, there would be a <<HTTP server>> stereotype, an <<application server>> stereotype, and <<IP sprayer>> and <<firewall>> stereotypes that can be arranged in a deployment diagram. Likewise, there must be a new set of relationships for these stereotypes, and a new set of properties for each of the stereotypes. Note that where there are special topology considerations that may also address additional sets of stereotypes. For instance, those stereotypes associated with WebSphere® portal server.

Figure 5:
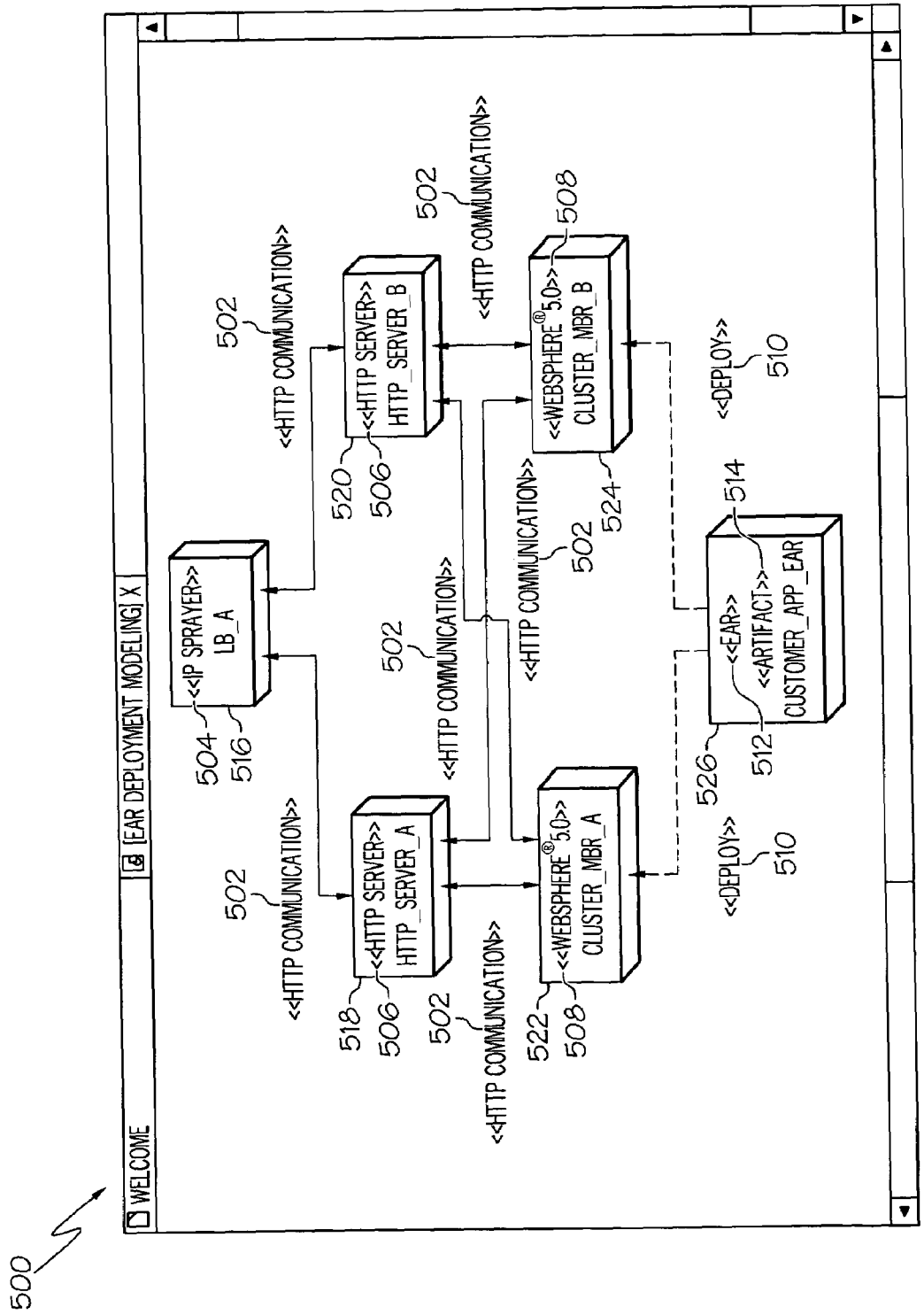
FIG. 5 depicts an exemplary deployment diagram of a simple application with predefined stereotypes in accordance with an illustrative embodiment of the present invention.

An example of a simple application using these predefined stereotypes would result in screens. FIG. 5 depicts an exemplary deployment diagram in accordance with an illustrative embodiment of the present invention. In screen 500, several stereotypes are shown such as <<HTTP Communication>> 502, <<IP Sprayer>> 504, <<HTTP Server>> 506, <<WebSphere® 5.0>> 508, <<deploy>> 510, <<EAR>> 512, and <<artifact>> 514. Although screen 500 depicts only a few stereotypes any number of stereotypes may be utilized.

Screen 500 uses these stereotypes to depict the type of communication used between devices such as LB_A 516 and HTTP_SERVER_A 518 and LB_A 516 and HTTP_SERVER_B 520, which is shown as <<HTTP Communication>> 502. Also depicted are the types of applications running on various elements such as <<WebSphere® 5.0>> 508 running on Cluster_Mbr_A 522 and Cluster_Mbr_B 524 as well as <<EAR>> 512 running on Customer_App_EAR 526. Thus, stereotypes add definition to the various elements.

Returning to unified modeling language deployment diagrams 404, in addition to selecting the unified modeling language deployment diagrams 404 from a list of patterns in patterns library 412, it will also be possible to overlay standard relationships from the patterns library 412 on top of a set of nodes drawn by hand.

So, for example, a network designer may lay out a proposed topology and then begin indicating which J2EE™ applications are deployed on each node. By making the tool aware of clustering, it can make the appropriate connections whenever a J2EE™ application was deployed on any clustered node to replicate that application connection across all the remaining nodes in the cluster. On the other hand, let us assume a user is working with a new Web application server (WAS) customer that is not familiar with clustering. The user can begin by laying out a single node, attaching a set of J2EE™ applications to that node, and then selecting a menu option applying an exemplary pattern called "Make highly available" that would then add additional nodes as necessary and show the application deployed across the new cluster.

Additionally, aspects of the present invention provide rudimentary capacity planning aids. If a user could specify some information about the expected use patterns of each application and the capacity of the hardware device in the network, a set of calculations could indicate if the planned network can meet those requirements.

To complement the "forward engineering" task as described with regard to unified modeling language deployment diagrams 404, the aspects of the present invention also provide a method to automate a "reverse engineering" task by allowing for the generation of our stereotyped deployment diagrams from an existing Web application server configuration. By reading the Extensible Markup Language (XML) metadata from a Web application server deployment node, or set of deployment nodes, an aspect of the present invention is able to completely generate a deployment diagram and generate the corresponding administration scripts. As an exemplary aspect of the present invention, the deployment nodes for Web application server have their deployment data represented by WCCM XMI files 406. However, deployment nodes of other types may have their deployment data represented by any other type of metadata repository.

Note that the WCCM XMI files 406 are not the only sources of information that would be needed or want to mine for population of meta-model 402. Some information such as IP addresses may not be available in the WCCM XMI files 406, and thus would have to be entered manually. Also, the node names and IP addresses of any existing hypertext transfer protocol servers would be entered manually, although the server configuration files could then be parsed for any additional information necessary. Finally, any nodes that fall outside of the realm of the WebSphere® common configuration model, such as firewalls, routers, and even Tivoli® Access Manager (TAM) reverse proxies, would have to be entered manually into the model, although stereotypes of all these node types should be available for the user to select from. Also, an alternative embodiment of the present invention allows for importing of database metadata such as from DB2® metadata 408. Importing the configuration information of DB2® metadata 408 nodes in the server aids in more advanced possibilities like capacity planning.

This ability to create unified modeling language deployment diagrams 404 of a full level of details by parsing the WCCM. XMI files 406 meta-model into meta-model 402, and then laying out a diagram from the meta-model 402, leads to another capability. Once these fully described models, commonly referred to as Platform Specific Models (PSMs), are created, then the created models may have details removed, or abstracted. These details are imported into abstract models, commonly referred to as (Platform Independent Models (PIMs), which may then be added to the existing patterns in the patterns library 412. A difference between the patterns in the patterns library 412 (PIMs) and the fully developed deployment models (PSMs) is one of detail. There is a continuum of detail that runs from partially specified models (PIMs) to fully specified models (PSMs).

Once there is a fully specified meta-model 402, either through direct creation from patterns in patterns library 412 and unified modeling language deployment diagrams 404, or by reverse engineering one from an existing deployment and then modifying that model from WCCM XMI files 406, the next step is to generate WSAdmin deployment scripts 410 from the meta-model 402. Deployment scripts may be one or more scripts for the deployment. Generating of the WSAdmin scripts 410 may include features such as:

(1) Automation of standard tasks such as deploying an application, updating an application, upgrading Web application server with a fix pack, etc.

(2) Handling these standard tasks on a timed basis, for example, through the generation of CRON tasks.

Automation of common "special purpose" tasks like replacing a machine, adding a machine, or taking an application entirely out of service can also be done from the information held in the meta-model 402. Even though, other scripts of other types needed for configuration, deployment and management of applications may also be generated. For instance, scripts for creating queues and topics in WebSphere® MQ, or scripts for creating databases and tables (DDL) can also be generated and executed.

Patterns library 412 contains a number of sample topology patterns that have been identified within the patterns for e-Business. Many of these "standard" topologies have been described, at a high level, in the Patterns for e-Business website and Redbooks website. These websites form a uniquely valuable source of information to be mined for example topologies, and may be used to direct a new deployment engineer to select the appropriate topology given the type of problem being solved. There are also a number of other combinations and topologies formed by the addition of other IBM® products into the basic topology models described by the Patterns for e-Business, forming a rich source of potential topologies that can be used to form the initial topology patterns library.

An aspect of the present invention is that a deployment engineer could begin a new deployment by selecting one of the appropriate topology patterns from the patterns library 412, and then customize the pattern to meet the engineer's own needs. Likewise, an alternate aspect of the present invention is that new deployment models may be added to the library in the same way that current extended development experience tooling allows for the development of patterns in code.

Finally, once a topology diagram is created, either through forward or reverse engineering, and has been deployed, then another use of meta-model 402 may be addressed. Existing system management software, such as systems management 414, may be configured in such a way that notifications from the software on error conditions and problems within the topology may be displayed within the topology model. This way, appropriate measures for resolving problems may be identified, formulated, and executed within the previously described meta-model 402. So as an example, if a systems management console reports a problem in that an application is reporting errors because a WebSphere® MQ queue that is referenced by the application does not exist, then the error can be identified within the topology diagram. A remedial measure may be described in the model, and a script to solve the problem may be generated and executed.

Thus, meta-model 402 is a formal description of the way that a model is constructed. Meta-model 402 provides for a transformation of existing unified modeling language deployment diagrams 404 and/or relationship patterns 412 into a displayable model. The user is able to modify the displayed model and add configuration detail to the devices and the relationships of those devices within a system so as to clearly describe a software application deployment and system configuration. A deployment model is created based on the devices, the relationship of the devices and the detail added by the user. The deployment model may then be transformed into a script model and that script model is transformed into deployment scripts. A detailed description of every element that is added to meta-model 402 is included in meta-model 402. Meta-model 402 requires that all of the models, including the augmented models formed from patterns and the patterns themselves, which may be "incomplete" or "template" models, conform to the description in meta-model 402.

Figure 6:
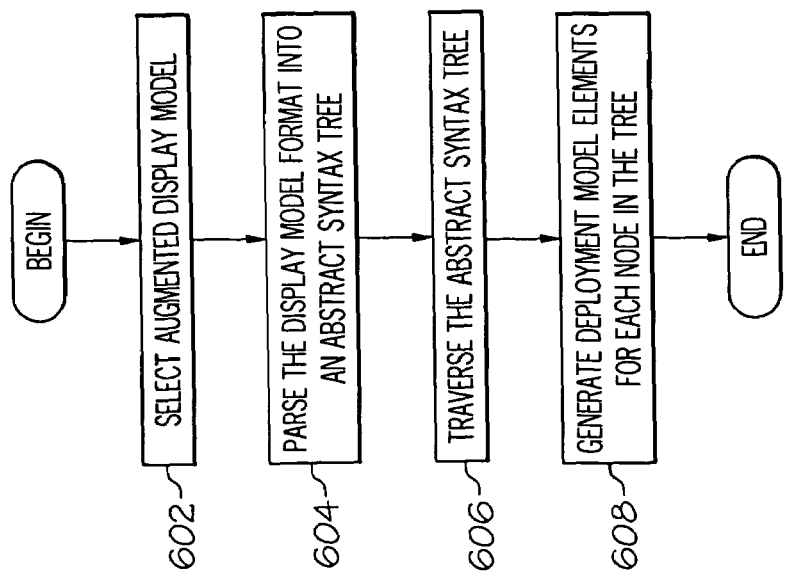
FIG. 6 is an exemplary flow diagram of the transformation of an augmented display model into a deployment model in accordance with an illustrative embodiment of the present invention.

FIG. 6 is an exemplary flow diagram of the transformation of an augmented display model into a deployment model in accordance with an illustrative embodiment of the present invention. As an aspect of the present invention, a user is able to select one or more augmented display model(s) (step 602). The deployment diagrams may be from unified modeling language deployment diagrams 404 and the patterns may be from pattern library 412 of FIG. 4. The selected augmented display model may contain an application server drawing element and database server drawing elements connected by a relationship. This relationship may have the stereotype "JDBC Connection" and may have attributes on the relationship for information like the name of the connection. The database drawing element that the relationship is connected to contains attributes such as the type of the database.

The selected augmented display models are then parsed into an abstract syntax tree, representing each of the drawing elements of the selected augmented display model(s) (step 604). An abstract syntax tree (AST) is a data structure representing something which has been parsed, often used as a compiler or interpreter's internal representation of a computer program while it is being optimized and from which code generation is performed. The range of all possible such structures is described by the abstract syntax. The abstract syntax tree is then traversed (step 606) and generate deployment model elements, like JDBCConnections, from the information in the selected augmented display model(s) such as the name of the relationship between the database and application server, and the type of the database server (step 608), with the operation ending thereafter.

Figure 7:
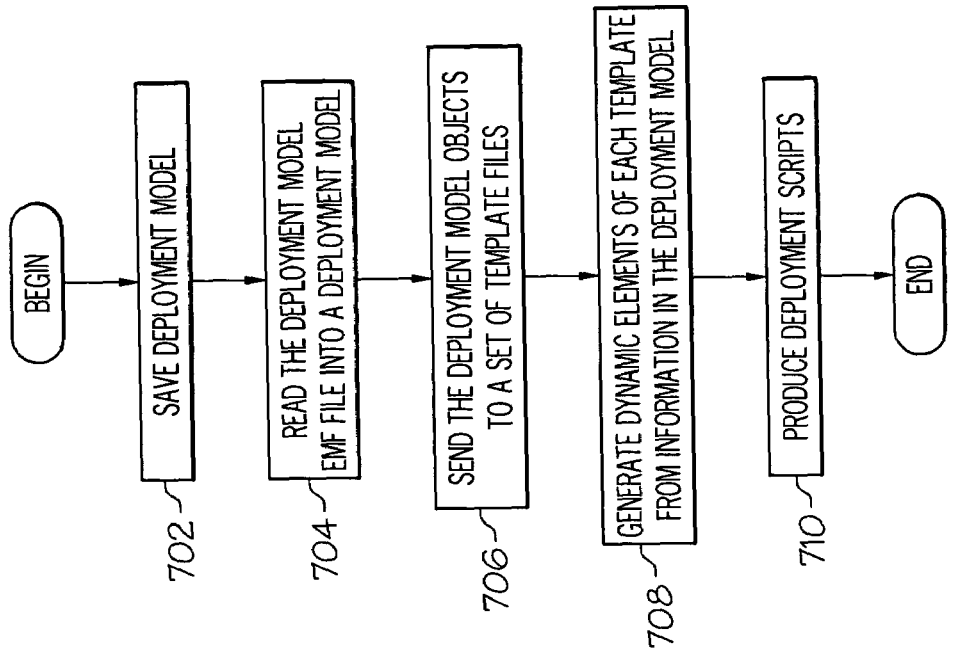
FIG. 7 is an exemplary flow diagram of the transformation of the deployment model into deployment scripts in accordance with an illustrative embodiment of the present invention.

FIG. 7 is an exemplary flow diagram of the transformation of the deployment model into deployment scripts in accordance with an illustrative embodiment of the present invention. As an aspect of the present invention, once the user makes all necessary augments and additions, the new deployment model is saved to a memory as a deployment model Eclipse Modeling Framework (EMF) file (step 702). This new deployment model is now sufficiently detailed to allow transformation into the form of deployment scripts. As shown in step 608 of FIG. 6, the deployment model may contain one or more JDBCConnection elements. A template file contains templates of the parts of the WSAdmin scripts needed to generate a Java™ Database Connectivity (JDBC™) connection in WebSphere®. The dynamic parts of this script and the parts that must be filled in, include information like the name of the connection and the type of the database. These are attributes of the JDBCConnection element in the deployment model, and the template file uses that information to generate the fully specified admin scripts. To generate the script the deployment model Eclipse Modeling Framework (EMF) file is read into a deployment model (step 704). Then the objects within the deployment model are sent to a set of template files corresponding to each element (step 706). Dynamic elements are generated for each template from the information in the deployment model (step 708). Finally, complete deployment scripts are produced and scheduled for deployment (step 710), with the operation ending thereafter.

Figure 8:
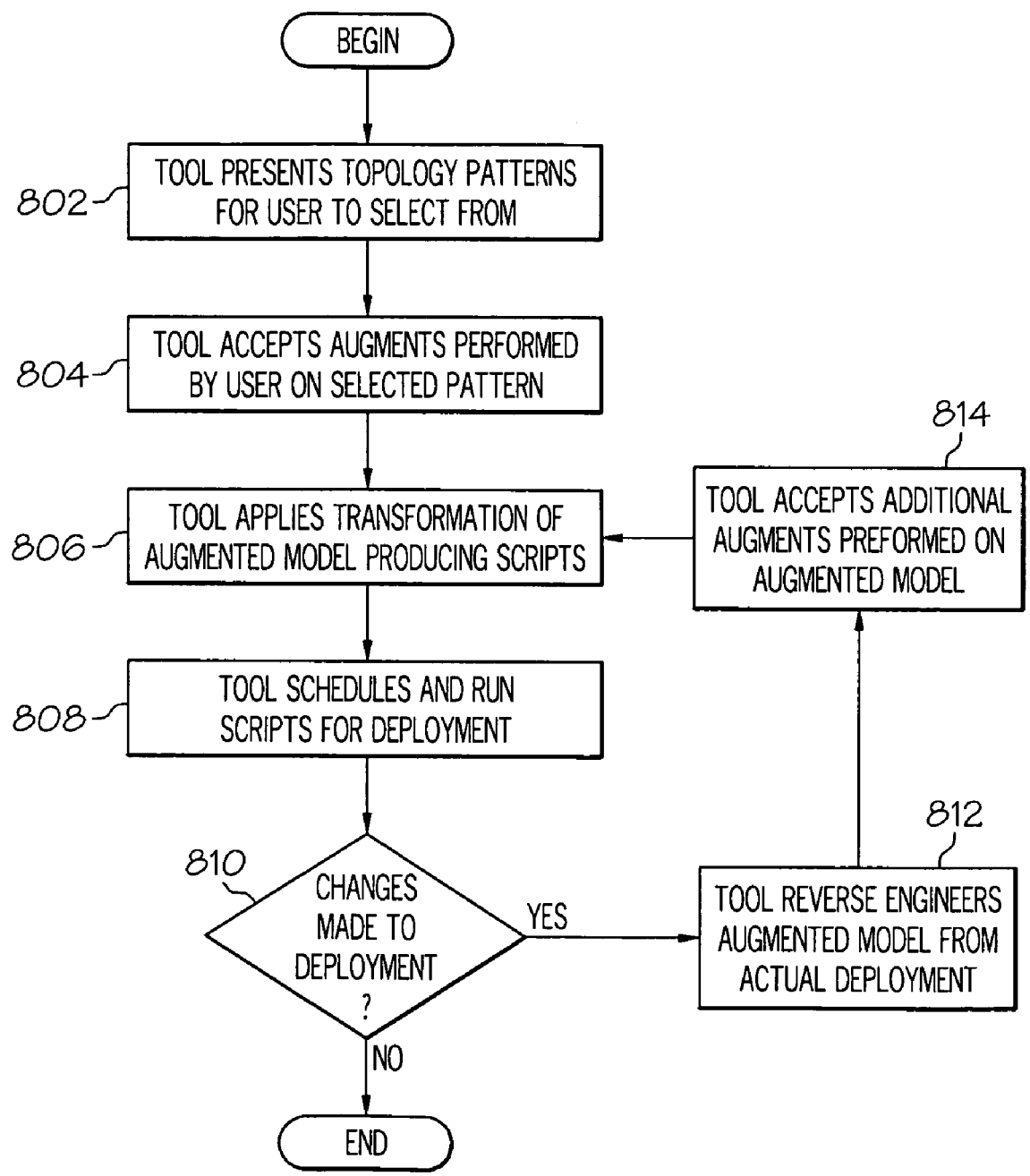
FIG. 8 depicts a flow diagram illustrating an exemplary operation of using a pattern to describe the topology in accordance with an illustrative embodiment of the present invention.

The different aspects of the present invention are focused on a repository of template diagrams, or patterns, that describe a topology consisting of physical software systems such as application server instances, HTTP servers, WebSphere® MQ queue managers, database servers and other physical servers that are designed to solve a particular business problem. FIG. 8 depicts a flow diagram illustrating an exemplary operation of using a pattern to describe the topology in accordance with an illustrative embodiment of the present invention. As the operation begins an interface or set of wizards within the tool would present the user with one or more of these patterns that the user may select from, thus forming a template topology that may be customized for the individual business (step 802). In step 802, the user is presented in an interface a list of available patterns to pick from. Then the user is allowed to pick the pattern from the list and the pattern is displayed in the interface as a template topology.

The template topology is represented as a set of unified modeling language component diagrams where unified modeling language nodes represent physical machines in this topology. Unified modeling language components represent individual software components such as applications to be installed, and other unified modeling language (or extension) artifacts represent application servers, database servers, and other containers of application software. Unified modeling language stereotypes indicate the role of each node, component, and container within this topology. Unified modeling language stereotypes also represent the connections between the nodes and components, such as HTTP connections between HTTP server and application server, Java™ Database Connectivity (JDBC™) connections between an application server and a database server, and Java™ Message Service (JMS) connections between an application server and a queue manager.

After the user selects a pattern, then the user may augment the selected template topology or pattern with additional properties and information describing the physical topology that corresponds to this logical topology. For instance, nodes are assigned to IP addresses and names, physical machine descriptions (operating system, number of processors, memory configuration, etc.) are attached to the nodes, and connections are associated with individual queue names or database identifiers. In any case, the goal is to fully specify the topology resulting to the level that it accurately represents the physical topology where the applications are to be installed. This may include adding additional nodes to create clusters of application servers, queue managers, HTTP servers, or database servers. These augments are then accepted by the tool as augments performed by the user on the selected pattern (step 804).

Applications installed on the servers, databases installed in the database server, queues configured in the queue manager, and other software artifacts running within the topology are attached to the previously described diagram. This attachment may be through cross reference to other unified modeling language models that may exist previously, or be created for this purpose. This augmented topology is represented by a set of model objects that can be easily manipulated and transformed, such as an eCore model based on the Eclipse Modeling Framework.

The tool then applies a transformation to this model (e.g. code generation) to produce a set of deployment scripts that represent the actions of installing and configuring the software artifacts described in the augmented deployment model into the physical nodes and application servers described in the augmented model (step 806). The transformation of the model into the deployment scripts may be performed using a technology that generates instruction code from models, such as Design patterns Toolkit or Java Emitter templates. This may be in the form of WSAdmin scripts (or the like) for WebSphere® application server, Another Neat Tool (ANT) scripts, batch files for installation of queues, or relational database Data Definition Language (DDL).

The tool then schedules the deployment of the artifacts by executing the aforementioned deployment scripts for the targeted device (step 808). Then a determination is made as to whether changes are to be made to the deployment of the model (step 810). If not, the operation of creating and scheduling the deployment model ends. If changes are to be made (step 810), then a feature in the tool is provided by which, once changes are made to the physical topology, that the model may be modified by parsing the metadata available in the physical configuration back into the model objects (step 812). Parsing may be performed by using a standard XML parsing engine and generating EMF model objects by using an XML-to-XML transformation engine such as XML type sheets. For instance, the XMI files described by the WCCM and which are present in a WebSphere® cell manager can be parsed and transformed back into the model objects previously described, as can database metadata and queue configuration information. This allows for "round-trip" engineering of topology diagram to deployed system, back to topology diagram.

Furthermore, a physical topology may be "abstracted" by removing physical augmentation of the type described and creating an abstract model that may then be added to the initial repository of template diagrams for use in other situations. Then the user may again augment the augmented template topology or pattern with additional properties and information describing the physical topology that corresponds to this logical topology. These additional augments are then accepted by the tool as augments performed by the user on the selected pattern (step 814) with the operation continuing to step 806 as previously discussed.

Figure 9:
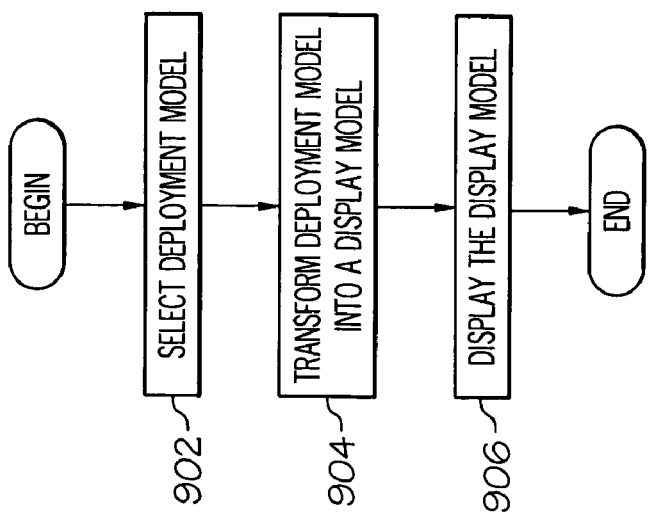
FIG. 9 depicts the operation of transforming a deployment model into a display model in accordance with an illustrative embodiment of the present invention.

FIG. 9 depicts the operation of transforming a deployment model into a display model in accordance with an illustrative embodiment of the present invention. As the operation begins, a deployment model is selected by the user that the user would like to view (step 902). Then, for each of the deployment model elements, a drawing element or display model elements is generated (step 904). For example, if the deployment model contains a JDBCConnection between an application server and a database, then, in addition to creating application server and database display elements, a connection relationship would then be created with a stereotype of "JDBC connection") between the application server that contains the JDBCConnection and a database of the appropriate type and name elsewhere in the display model. Once these display elements are created and formed into a display model, then the display model is displayed to the user (step 906), with the operation ending thereafter.

Figure 10:
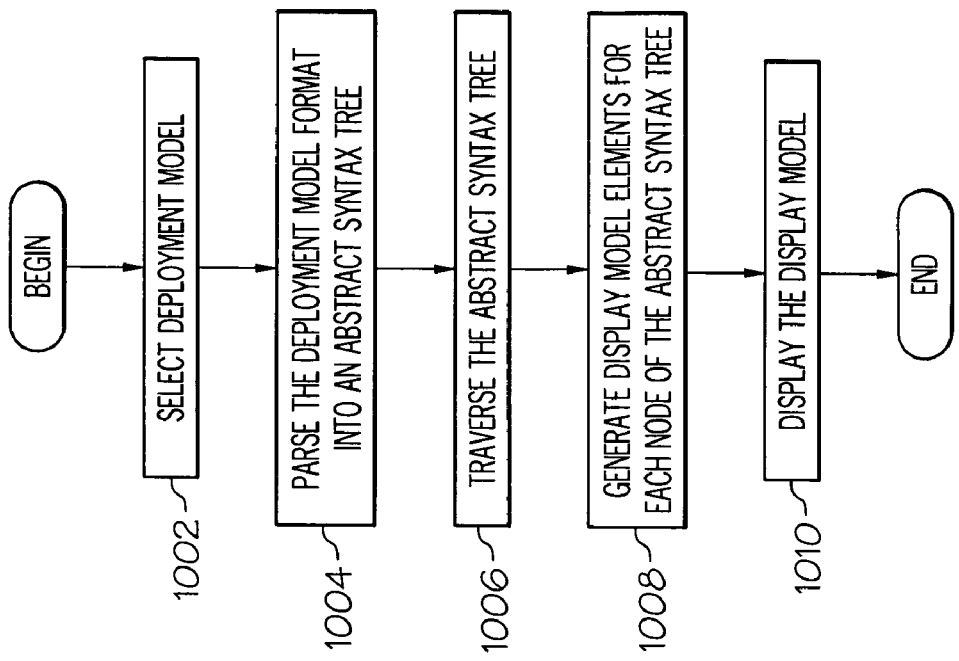
FIG. 10 depicts the operation of reverse engineering a deployment model into an augmentable display model in accordance with an illustrative embodiment of the present invention.

FIG. 10 depicts the operation of reverse engineering a deployment model into an augmentable display model as described in step 812 of FIG. 8 in accordance with an illustrative embodiment of the present invention. As the operation begins, a user selects a previously deployed model to which changes are to be made (step 1002). The deployment model is then parsed into an abstract syntax tree, which represents each of the elements in the deployment model (step 1004). An example of parsing the deployment model may be using Java Management Extension (JMX) interfaces in WebSphere® to parse the configuration of a WebSphere® deployment into a set of Java objects. Another example may parse a set of deployment extensible markup language (XML) files from BEA WebLog™ into a Java™ document object model (DOM) tree. In either example, the result is the same, where there is a set of objects that describe the deployment elements (i.e. what servers exist, how they are configured, etc.) in terms specific to the type of environment that is reverse-engineered. The abstract syntax tree is then traversed (step 1006) and display model elements are generated for each of the elements in the abstract syntax tree (step 1008). These display elements are then formed into a display model which is displayed to the user (step 1010), with the operation ending thereafter.

Thus, the different embodiments of the present invention provide a tool with a similar level of topology modeling capability for administrators and deployment engineers. A user is allowed to import deployment diagrams and/or patterns that define a standard relationship between devices. The deployment diagrams and/or patterns are then transformed so into a display model that may be displayed in a graphical user interface. The user is allowed to transform or augment the displayed model to add or delete devices and add detail to the devices and the relationships between devices so that a representation of all of the information necessary to perform application deployment and system configuration is provided. This transformation is then saved as a deployment model that is produced based on the detailed representation. Then the deployment model is transformed again into a script model from which scripts may be produced for actual deployment of the application and system configuration.

The invention can take the form of an entirely hardware embodiment, an entirely software embodiment or an embodiment containing both hardware and software elements. In an illustrative embodiment, the invention is implemented in software, which includes but is not limited to firmware, resident software, microcode, etc.

Furthermore, the invention can take the form of a computer program product accessible from a computer-usable or computer-readable medium providing program code for use by or in connection with a computer or any instruction execution system. For the purposes of this description, a computer-usable or computer readable medium can be any apparatus that can contain, store, communicate, propagate, or transport the program for use by or in connection with the instruction execution system, apparatus, or device.

The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk—read only memory (CD-ROM), compact disk—read/write (CD-R/W) and DVD.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A computer implemented method in a data processing system for a software deployment, the method comprising:
   selecting a topology pattern from a plurality of topology patterns to form a selected topology pattern, wherein the selected topology pattern describes an arrangement of software and hardware devices, and wherein the selection of the selected topology pattern is made through a user interface;
   receiving augments to the selected topology pattern to form an augmented topology pattern, wherein the augments are selected by a user, and wherein the selected topology pattern represents a set of component diagrams wherein nodes represent physical machines in the selected topology pattern, and wherein the set of component diagrams represent at least one of an individual software component, application, application server, database server, and container;
   transforming the augmented topology pattern into a set of deployable scripts, wherein the set of deployable scripts is used for the software deployment;
   scheduling the set of deployable scripts for deployment;
   deploying the set of deployable scripts to a targeted device;
   determining, based on the set of deployable scripts, whether additional augments are to be performed on the augmented topology pattern;
   responsive to determining that additional arguments are to be performed on the augmented topology pattern, accepting the additional augments made to the augmented topology pattern to form a second augmented topology pattern;
   transforming the second augmented topology pattern into the set of deployable scripts; and
   transforming deployment metadata into a reverse engineered topology pattern, wherein the deployment metadata is retrieved from a deployment node, wherein the deployment metadata is stored in the deployment node data structure, and wherein the reverse engineered topology pattern is stored in a pattern data structure as a new topology pattern.

2. A data processing system comprising:
   a bus system;
   a communications system connected to the bus system;
   a storage device connected to the bus system, wherein the storage device includes a set of instructions; and
   a processing unit connected to the bus system, wherein the processing unit executes the set of instructions to:
   selecting a topology pattern from a plurality of topology patterns to form a selected topology pattern, wherein the selected topology pattern describes an arrangement of software and hardware devices, and wherein the selection of the selected topology pattern is made through a user interface;
   receiving augments to the selected topology pattern to form an augmented topology pattern, wherein the augments are selected by a user, and wherein the selected topology pattern represents a set of component diagrams where nodes represent physical machines in the selected topology pattern, wherein the set of component diagrams represent at least one of an individual software component, application, application server, database server, and container;
   transforming the augmented topology pattern into a set of deployable scripts, wherein the set of deployable scripts is used for the software deployment;
   scheduling the set of deployable scripts for deployment;
   deploying the set of deployable scripts to a targeted device;
   determining, based on the set of deployable scripts, whether additional augments are to be performed on the augmented topology pattern;
   responsive to determining that additional arguments are to be performed on the augmented topology pattern, accepting the additional augments made to the augmented topology pattern to form a second augmented topology pattern;

transforming the second augmented topology pattern into the set of deployable scripts; and transforming deployment metadata into a reverse engineered topology pattern, wherein the deployment metadata is retrieved from a deployment node, wherein the deployment metadata is stored in the deployment node data structure, and wherein the reversed engineered topology pattern is stored in a pattern data structure as a new topology pattern.

3. A computer program product comprising:

a computer storage medium including computer usable program code for software deployment, the computer program product comprising;

computer usable program code for selecting a topology pattern from a plurality of topology patterns to form a selected topology pattern, wherein the selected topology pattern describes an arrangement of software and hardware devices, and wherein the selection of the selected topology pattern is made through a user interface;

computer usable program code for receiving augments to the selected topology pattern to form an augmented topology pattern, wherein the augments are selected by a user, computer usable program code for transforming deployment metadata into a reverse engineered topology pattern, wherein the deployment metadata is retrieved from a deployment node, wherein the deployment metadata is stored in the deployment node data structure, and wherein the reversed engineered topology pattern is stored in a pattern data structure as a new topology pattern.

* * * * *